June 21, 1932.  R. A. STABLER  1,864,261
DEMOUNTABLE AUTOMOBILE WHEEL
Filed Nov. 7, 1931  2 Sheets-Sheet 1

Inventor
R. A. Stabler
By Clarence A. O'Brien
Attorney

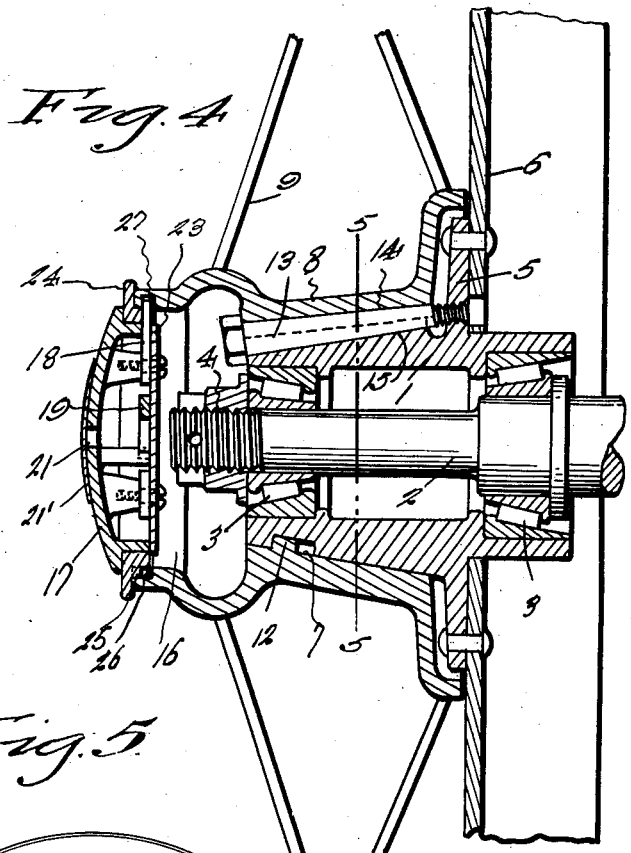
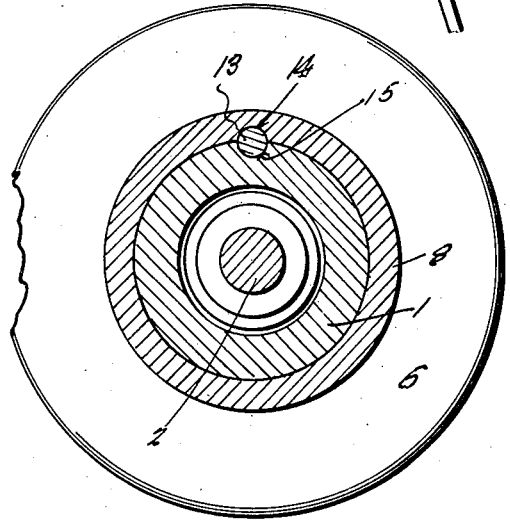
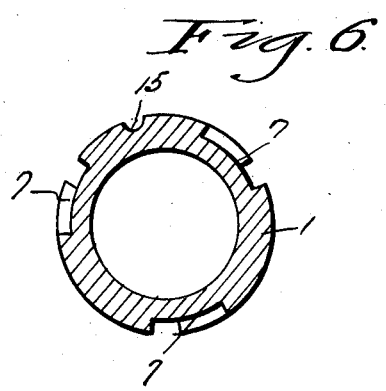

Patented June 21, 1932

1,864,261

UNITED STATES PATENT OFFICE

REUBEN A. STABLER, OF ENDICOTT, NEW YORK

DEMOUNTABLE AUTOMOBILE WHEEL

Application filed November 7, 1931. Serial No. 573,645.

This invention relates to demountable automobile wheels, the general object of the invention being to provide a wheel which can be detached by removing but one bolt, and to provide a hub cap containing a lock which cannot be removed without a key.

Another object of the invention is to so locate the bolt and the lock that the parts are hidden from view.

This invention also consists in certain other features of construction and in the combination and arrangement of the several parts to be hereinafter fully described, illustrated in the accompanying drawings and specifically pointed out in the appended claim.

In describing the invention in detail reference will be had to the accompanying drawings wherein like characters denote like or corresponding parts throughout the several views, and in which:—

Fig. 4 is a section on line 4—4 of Fig. 2.

Fig. 5 is a section on line 5—5 of Fig. 4.

Fig. 6 is a cross sectional view thru the inner hub.

Figure 1:
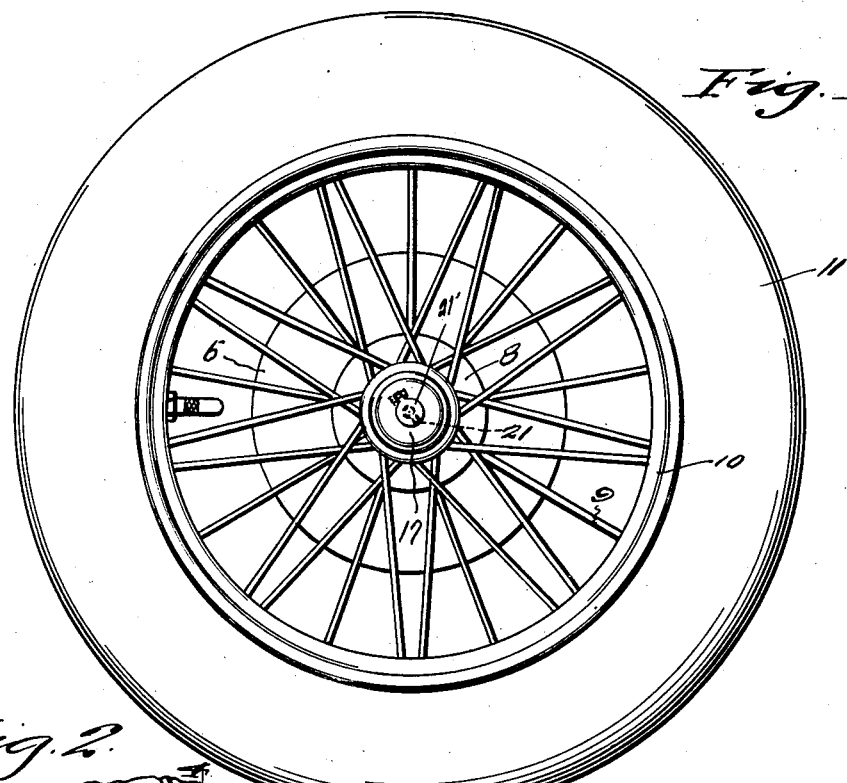
Figure 1 is a view of the complete wheel constructed in accordance with this invention.
Figure 2:
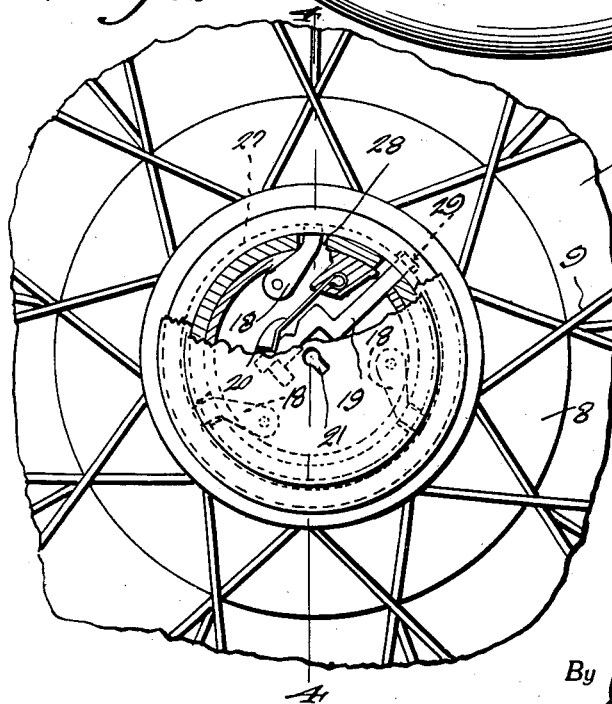
Fig. 2 is an enlarged view of the central portion of the wheel with part of the hub cap broken away, and part in section to show the internal construction.
Figure 3:
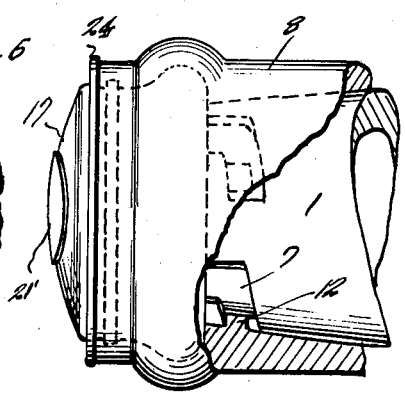
Fig. 3 is a side view with parts broken away of the outer part of the hub assembly.

In these drawings, the numeral 1 indicates the inner hub of the wheel hub assembly which is rotatably arranged on the spindle 2 by means of the anti-friction bearings 3, the hub being held in place by the nut 4 and a cotter pin or the like is used to hold the nut in place.

Said hub is formed with a flange 5 to which the brake drum 6 is riveted. The outer portion of the hub 1 is formed with the bayonet grooves 7.

The exterior hub is shown at 8 and is internally tapered to fit the exterior taper of the hub 1. This hub 8 has the spokes 9 connected therewith which support the rim 10 which carries the tire 11. The hub 8 is formed with the internal lugs 12 for engaging the bayonet slots or grooves 7, and after the lugs are properly engaged with the bayonet grooves, the hub 8 is held against turning by means of the single bolt 13 which passes thru alined grooves 14 and 15 formed in the hubs 8 and 1 and has its threaded end engaging a threaded hole in the flange 5 of the inner hub 1.

It will of course be understood that when the lugs 12 are properly engaged with the bayonet grooves 7, the grooves 14 and 15 will be in alinement, so that the bolt can be put in place.

The outer hub 8 is formed with a chamber 16 for receiving the threaded outer end of the spindle and the nut as well as the head of the bolt 13. A cap 17 closes the chamber and contains the pivoted dog 18 and the lock bolt 19 which is held in either one of its two positions by the spring 20, the bolt being inserted and retracted by a key placed in the keyhole 21 formed in the cap.

A plate 23 is fastened to the internal part of the cap by screws or the like and encloses a part within the cap. The cap fits in a flanged ring 24 which has a part fitting in the outer end of the hub 8, and the ring is held against turning movement in the hub by a lug 25 engaging a nut 26 in the hub. The outer end of the hub 8 is formed with an internal annular groove 27 for receiving the outer ends of the dogs 18 which pass through openings in the flange of the cap and the ring 24 is formed with notches 28 through which the dogs or tumblers 18 pass and the part of the inner wall of the groove 27 in the hub 8 is formed with a keeper recess 29 for receiving the bolt 19 when the same is projected, which prevents turning movement of the cap and ring.

From the foregoing, it will be seen that when the wheel is to be removed, it is necessary to insert a key in the keyhole 21 and turn the key to retract the bolt 19. Then the cap is turned to cause the dog or tumblers 18 to be retracted from the groove 27 after which the cap and ring can be removed from the hub 8.

The bolt 13 is then removed and the hub 8 turned to move the lugs 12 out of the bayonet grooves 7, after which the exterior hub 8 with the spokes, rim and tire, can be removed. Of course in placing the wheel on the hub 1, the hub 8 is placed over the hub 1 and then turned to cause the lugs 12 to interlock with the grooves 7 and then the bolt 13 is put in place to prevent turning movement of the hub 1, and then the ring 24 is pushed into the end of the hub and the cap 17 turned slightly by hand or key to bring the tumblers or dogs 18 against the sides of the notches 28 in the ring 24 which throws them into the grooves 27 in the hub 8. Then to prevent turning movement of the parts, the key is inserted and turned in a direction to cause the bolt 19 to engage the keeper recess 29 which locks the parts in position. The keyhole is normally covered by a spring closure member 21'.

Thus it will be seen that the wheel is held in position by the single bolt and the lock 12 engaged in the bayonet grooves 7 and then it is simply necessary to remove the single bolt and then turn the wheel to cause the lugs 12 to disengage the bayonet grooves 7. The hub cap can be easily and quickly placed in position and removed, and is locked in position by the key actuated bolt.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

In a wheel of the class described, an inner hub for engagement with a spindle having a flange adjacent its inner end and said hub tapering to its outer end, an outer hub tapered to fit the taper of the inner hub and having a flange on its inner end enclosing the flange on the inner hub, the inner hub having a longitudinally extending groove in its exterior surface and the outer hub having a longitudinally extending groove in its interior surface, a bolt passing through the grooves and threaded in the flange of the inner hub, said outer hub being longer than the inner hub and forming a chamber for receiving the head of the bolt and the outer end of the spindle, and a bayonet joint between the hubs, the bolt holding the hubs against relative rotary movement with the bayonet joint in operative position.

In testimony whereof I affix my signature.

REUBEN A. STABLER.